United States Patent

[11] 3,581,077

[72] Inventors Glenn Damewood;
 Cecil R. Sparks; James D. King, all of San Antonio, Tex.
[21] Appl. No. 741,528
[22] Filed July 1, 1968
[45] Patented May 25, 1971
[73] Assignee Southern Gas Association
 San Antonio, Tex.

[54] ELECTRICAL ANALOG MODEL FOR FLUID FLOW TRANSMISSION SYSTEM
18 Claims, 4 Drawing Figs.

[52] U.S. Cl. ................................................ 235/184,
 235/197, 307/229, 328/142, 333/29
[51] Int. Cl. ............................................... G06g 7/57,
 H03h 7/36
[50] Field of Search ........................................ 235/184,
 197; 307/229, 237, 304, 320; 328/142; 333/29

[56] References Cited
UNITED STATES PATENTS

| | | | |
|---|---|---|---|
| 3,146,346 | 8/1964 | Evangelisti et al. | 235/184 |
| 3,191,130 | 6/1965 | Rudd et al. | 307/320X |
| 3,207,889 | 9/1965 | Evangelisti et al. | 235/184 |
| 3,260,968 | 7/1966 | Drapkin | 333/29 |
| 3,404,263 | 10/1968 | Williams | 235/197X |
| 3,404,266 | 10/1968 | Woodley | 235/197 |
| 3,393,369 | 7/1968 | Embley et al. | 235/197X |
| 3,396,267 | 8/1968 | Dietrich | 235/184X |
| 3,492,497 | 1/1970 | Gilmour et al. | 235/197X |

OTHER REFERENCES

R. M. Searing: Variable capacitance Diodes used as Phase Shift Devices "Proceedings of the Ire"; March 1961 pages 640— 641

Primary Examiner—Eugene G. Botz
Assistant Examiner—Felix D. Gruber
Attorney—Hyer, Eickenroht, Thompson and Turner ABSTRACT: An electrical analog model for simulating fluid flow characteristics in a pipeline flow system, such as a gas transmission system, wherein the analog includes a source of electrical voltage proportional to inlet fluid pressure, a compressor station analog, a plurality of pipeline section analogs, a regulator station analog, and a flow transient or load utilization simulator. The compressor station analog includes a capacitor pump, a source of alternating current for driving the capacitor pump, a controlled-level amplifier for controlling the drive to the capacitor pump, and a differential amplifier responding to changes in the output of the capacitor pump and driving the controlled level amplifier. Each line section analog is a delay line including a nonlinear resistance element, such as a field effect transistor having a resistance proportional to the current passing through it, and a nonlinear voltage variable capacitance diode having a capacitance proportional to the inverse square root of impressed voltage. The regulator analog is a voltage regulator including a control element, such as a field effect transistor, and a differential amplifier responding to changes in regulator analog output voltage to drive the field effect transistor. The transient and load utilization simulator includes a function generator programmed by an opaque tape to simulate fluid withdrawal. The tape controls the amount of light between a light source and a light sensor which produces an output current in response to light. The output current produced is impressed on the electrical analog system by a flow modulator, such as by modulating the regulator station output with this current.

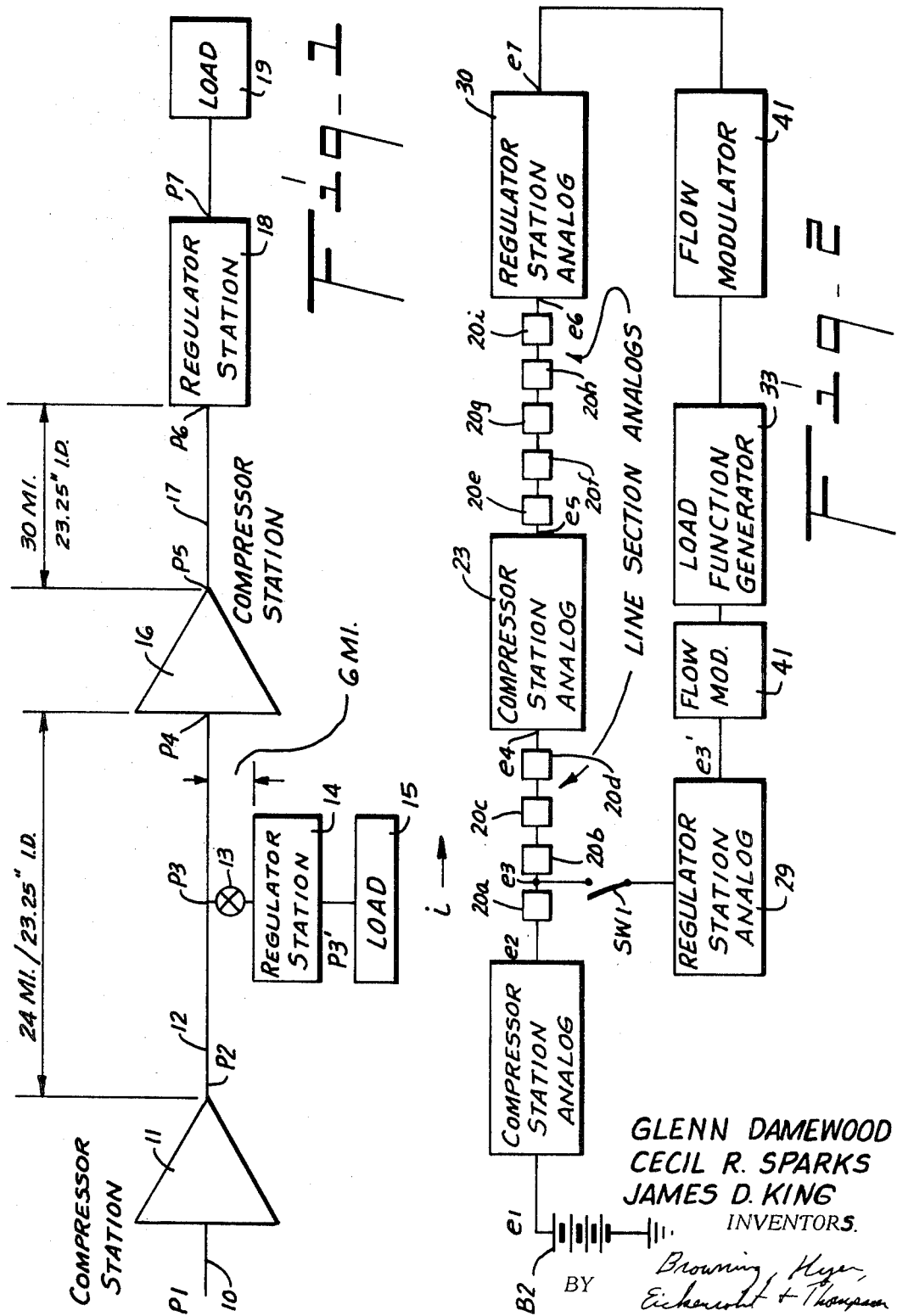

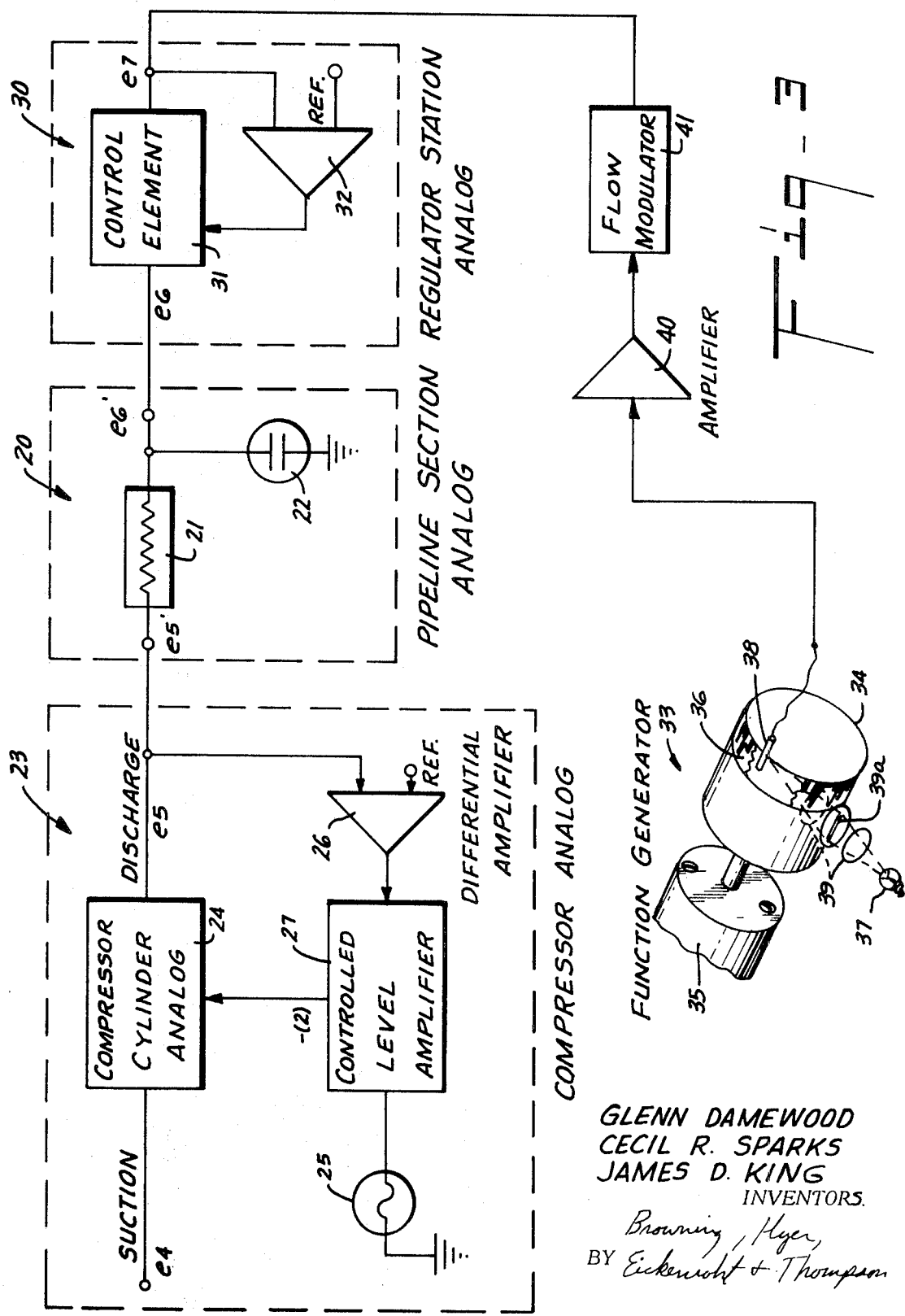

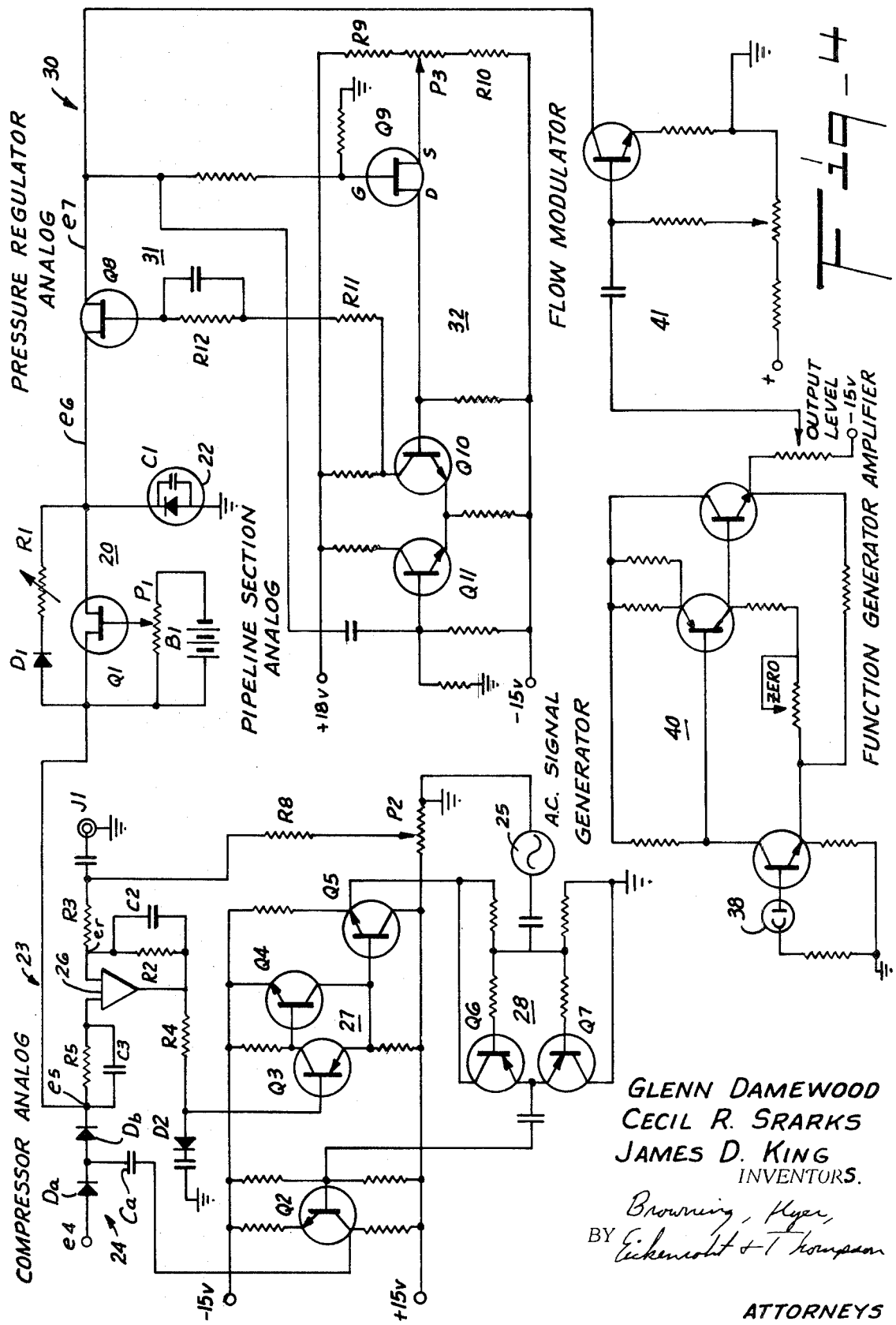

a great deal so that the transmission system is constantly subjected to a varying load. The result of varying load and other conditions which deviate from steady-state flow is that the fluid system is subjected to flow transients, and these flow transients affect the flow of fluid throughout the system. In order to optimize flow throughout the system and thus provide efficient and economical fluid transportation, some means must be provided for giving analytical data on the effects of known or predicted flow transients on this flow.

ELECTRICAL ANALOG MODEL FOR FLUID FLOW TRANSMISSION SYSTEM

This invention relates to electrical analogs and, in one of its aspects, to an electrical analog and method for simulating flow characteristics in pipeline systems, such as a natural gas distribution or transmission system, including the effect of flow transients of such flow. In another aspect, it relates to an analog of the component parts of a fluid transmission system for use in an electrical analog thereof, such as a regulator station analog, pipeline section analog and a compressor station analog. In another aspect, it relates to apparatus for simulating flow transients and load withdrawal demands on a pipeline system and for impressing such transients demands on an electrical analog of such a system.

Many pipeline systems, such as cross-country natural gas transmission pipelines, transport fluid under pressure to various users through miles of pipeline, and sometimes through several intermediate compression and regulation stages. The amount of gas required by these users, for example a large metropolitan gas company distribution system, will vary a great deal so that the transmission system is constantly subjected to a varying load. The result of varying load and other conditions which deviate from steady-state flow is that the fluid system is subjected to flow transients, and these flow transients affect the flow of fluid throughout the system. In order to optimize flow throughout the system and thus provide efficient and economical fluid transportation, some means must be provided for giving analytical data on the effects of known or predicted flow transients on this flow.

Although there have been analytical solutions which are adequate for steady-state fluid flow computation, the problem of transient pipeline flow has historically defied solution on a rigorous analytical basis. With the advent of high-speed computational devices, however, solution of this transient flow problem has become possible. However, these devices, such as digital or analog computers, involve solution of the nonlinear pipeline transient flow equations and, thus, require highly sophisticated and expensive electronic equipment, and highly skilled personnel.

It is, thus, an object of this invention to provide a system and method for defining transient flow characteristics without the necessity of solving the complex flow equations describing transient flow. Another object is to provide such a system and method which uses relatively simple and inexpensive electronic equipment and does not require the attention of highly skilled personnel.

Another object is to provide such a system and method which employs an electrical analog model of fluid flow system so that measurement of electrical quantities, such as voltage or current, in the analog model provides information about the flow quantities of the fluid system during both steady-state and transient flow conditions.

It is another object to provide such an analog in which each of the component parts of the fluid system and the transient coupling between these parts is simulated.

Other objects, advantages and features of this invention will be apparent to one skilled in the art upon consideration of the written specification, the appended claims, and the attached drawings, wherein:

FIG. 1 is a block diagram of an illustrative natural gas pipeline system to be simulated;

FIG. 2 is a block diagram of an electrical analog of the pipeline system of FIG. 1;

FIG. 3 is a more detailed block and schematic diagram of the analog system of FIG. 2 showing the component parts of the system; and FIG. 4 is a schematic diagram of the analog systems of FIGS. 2 and 3 and the component parts thereof.

In accordance with this invention, a pipeline system, such as a gas distribution or transmission system, is simulated by an electrical model or analog system wherein electrical quantities, such as voltage or current throughout the analog system simulate corresponding flow quantities throughout the fluid system. Component parts of the fluid system are each individually simulated by electrical simulators and these are interconnected in a manner analogous to the fluid system. Flow transients are simulated by generating an electrical signal proportional thereto and the impressing this signal on the electrical model or analog so that the electrical quantities of the electrical analog are affected in a manner analogous to the way that flow transients affect the flow quantities of the fluid system. Thus, the present invention provides adequate data on both transient and steady-state flow conditions without the necessity of solving the complex flow equations, by the use of a relatively inexpensive and easily-constructed electronic simulator or analog model which simulates actual pipeline transient response on a physical basis. Also, the simulator can be operated and maintained by persons of moderate skills.

Referring to the drawings, in FIG. 1, a typical pipeline transmission system for natural gas is illustrated. Of course, the invention is equally applicable to other pipeline systems for transporting other fluids and also to distribution systems. Gas at pressure P1 enters the upstream end of the system from a storage reservoir or adjoining pipeline (not shown) through an inlet 10 and if pressure P1 is below the desired pressure for satisfactory transportation of the gas, it is then conducted to a compressor station 11. The compressor station functions to raise pressure P1 to a suitable pressure for transportation, such as the discharge pressure P2. Gas is then conducted from the compressor discharge at pressure P2 through a pipeline 12 which is illustrated as 24 miles in length. The gas undergoes a pressure drop through pipeline 12 to pressure P3 and a further pressure drop to pressure P4 which is again at a pressure insufficient for satisfactory operation. As illustrated, gas at pressure P3 may be discharged through a valve 13 to a regulator station 14 and thus to a load 15. Regulator station 14 functions to provide a constant lower pressure P3' to load 15 despite varying withdrawal rates.

At the termination of pipeline 12, gas at pressure P4 enters a second compressor station 16 and the gas pressure is then raised to a pressure P5 suitable for continuing transportation through a pipeline 17, which is illustrated as 30 miles in length. As the gas flows through pipeline 17, it undergoes an additional pressure drop to a pressure P6 and enters a regulator station 18. This regulator station functions to maintain an output pressure P7 to a load 19 despite varying withdrawal rates. The loads 15 and 19 may be metropolitan gas distribution systems or other loads for utilizing the gas.

DEVELOPMENT OF THE ANALOGY

Before an electrical analog model can be developed for the transmission system of FIG. 1 or any fluid flow system, it is necessary to develop the analogies between electrical quantities, and the passage of electrical current through the electrical model, and fluid flow quantities and the passage of fluid through the fluid system. These analogies have been derived by comparing the mathematical equations governing dynamic fluid flow and electrical current flow through a given electrical circuit until equations of equivalent form are found. Certain variables in the electrical equation can then be used to represent corresponding variables in the fluid flow equations. Generally, several different analogies can be set up in this manner, but one set of analogies will probably be found most convenient to work with and require the simplest electronic circuitry. The complex nonlinear equations obtained need not be solved, but only written in incremental form.

By way of illustration of the development of such an analogy and the electrical analog model based on the chosen analogy, reference will hereinafter be made to the flow of natural gas through the pipeline distribution system illustrated in FIG. 1. Similar techniques can be utilized in developing analogies and an electrical analog model for other fluid flow systems.

The equations for one-dimensional, isothermal, compressible pipe flow characteristic of most pipelines transporting gaseous media are mathematically-nonlinear and cannot be solved analytically. These equations have been found to be:

$$\frac{\gamma p}{\gamma x}+\frac{1}{g}\frac{\gamma \rho V^2}{dx}+\frac{1}{g}\frac{\gamma \rho V}{\gamma t}+\frac{f}{2D}\frac{\rho V^2}{g}+\frac{\gamma \rho h}{\gamma x}=0 \quad (1)$$

$$\frac{\gamma \rho}{\gamma t}+\frac{\gamma \rho V}{\gamma x}=0 \quad (2)$$

$$p=\rho\ RTZ \quad (3)$$

Where $p$ = fluid pressure
$\rho$ = fluid density
$V$ = fluid velocity
$h$ = fluid head
$R$ = gas constant, = 1535/mol. wt.
$f$ = pipe friction factor
$T$ = fluid temperature
$Z$ = fluid compressibility factor
$D$ = pipeline diameter (id)
$g$ = acceleration constant
$x$ = distance along the pipe
$t$ = time Equation (1) is the equation of motion and the first two terms may be considered as the gradient of total pressure (static plus dynamic) along the pipeline, the third is the rate of change of momentum or inertial term, the fourth is pipe frictional loss, and the fifth is an elevation profile term. Equation (2) is the equation of continuity and equation (3) is the equation of state for the gas which must be taken into account due to the nonideal character of the gas.

When applying suitable simplification of these basic equations to the case of steady-state flow, they can be integrated to provide rigid solutions. However, this is not the case when they are applied to pipeline transient flow solutions. When applied to the transient flow case, the term $$\frac{1}{g}\frac{\gamma \rho V^2}{\gamma x}$$

can be neglected relative to $\alpha p/\alpha x$ to define the gradient of total pressure. Also, in the case of a natural gas pipeline analog, the term $\alpha p V/\alpha t$ (inertial) can be neglected because it is insignificant in most practical gas pipeline transient problems where transients are normally sufficiently slow that inertial effects are negligible. However, where inertial effects are effectual because of faster transients or in hydraulic systems, this term would be included.

Also, the elevation term ($\alpha \rho h/\alpha x$), for most gas flow systems of practical concern, can be omitted as trivial. Thus, equation (1) can be rewritten as:

$$\frac{\gamma p}{\gamma x}+\frac{f\rho V^2}{2gD}=0 \quad (1a)$$

Since equations (1a), (2), and (3) cannot be integrated to provide an exact solution to the transient flow problem in closed form, a special computational technique, such as the electrical analog model, must be used.

Now, defining weight rate of mass flow as $m$ so that $m=\rho\ VA$ (where $A$ = area and $V$ = average fluid velocity in the pipeline (4)

and by using equation (3) to transform $\rho$ to $p$ in equations (1a) and (2), these equations become, respectively:

and
$$\frac{dp}{dx}+\frac{m^2 fRTZ}{p2gDA^2}=0 \quad (5)$$

$$\frac{dm}{dx}+\frac{A}{RTX}\times\frac{dp}{dt}=0 \quad (6)$$

These equations describe the dependency of line pressure gradient on pipe friction, and the dependency of transients flow on line pack variations.

It has been found that the equations describing electrical delay lines are of equivalent form. For example, delay line equations of motion and continuity are:

$$\frac{de}{dx}+L\frac{di}{dt}+iR=0 \quad (7)$$

and $$\frac{di}{dx}+\frac{dCe}{dt}=0 \quad (8)$$

Where $L$ = inductance per unit length $dx$, (henries)
$C$ = electrical charge per unit length $dx$, (coulombs)
$R$ = Resistance per unit length $dx$, (ohms)
$e$ = Voltage
$i$ = Current As previously stated, for most problems involving long, cross-country pipelines, the inertial terms in Equation (1) viz., $\alpha \rho V/\alpha t$, may be assumed zero. Therefore, the electrical inductance $L$ can be neglected in the analog, and any length of pipe length $l$ can be simulated by an electrical R-C network. Further, greater lengths of pipe can be simulated by coupling multiple sections of this basic R-C delay line section. Thus, where a natural gas pipeline is analoged, equation (7) can be rewritten as:

$$\frac{de}{dx}+iR=0 \quad (7a)$$

Assume the following analogies for simulating pipeline pressure at a point along the pipeline and mass flow:

(A) $p^2\alpha e$
$m\alpha i$ where:

$p$ = pipeline fluid pressure
$m$ = mass flow
$e$ = voltage, delay line to ground
$i$ = current or (B) $p\alpha e$
$m\alpha i$ Using set of analogies (A) in which voltage ($e$) is proportional to the square of pressure ($p^2$) and current ($i$) proportional to mass flow ($m$) and considering the lumping factor and the time speed up from real time to analog time, the following conversion factors can be chosen which will define the relationship between the electrical quantities throughout the analog to corresponding fluid system quantities:

$$a=\frac{p^2}{e}, \text{ or } p^2=ae, \text{ or } p=\sqrt{\frac{a}{e}} \quad (9)$$

$$\beta=\frac{m}{i} \text{ or } m=\beta_i \quad (10)$$

$\epsilon$ = feet of pipeline per section $$\delta=\frac{\text{analog time}}{\text{real time}} \text{ (time speed-up)}$$

These factors can be selected to give a convenient and workable relationship between the electrical quantity and corresponding fluid quantity, depending on, for example, the ranges of pressures and fluid flow involved and the maximum voltages and current for the electrical circuitry used.

Inserting these factors in the pipeline equations (5) and (6), these become $$\frac{de}{dx}+i\left(\frac{\beta\epsilon}{a}\cdot\frac{mfRTZ}{gDA^2}\right)=0 \quad (5a)$$

$$\frac{di}{dx}+\left(\frac{a\epsilon}{\beta\delta}\cdot\frac{A}{2pRTZ}\right)\frac{de}{dx}=0 \quad (6a)$$

which are in equivalent form to the delay line equations (7a) and (8), thus $$R_1=\frac{\beta\epsilon}{a}\cdot\frac{mfRTZ}{gDA^2} \quad (5b)$$

$$C_1=\frac{a\epsilon}{\beta}\cdot\frac{A}{pRTZ} \quad (6b)$$

It should be recognized that the electrical components thus defined (resistors and capacitors) are not simple fixed value components as normally used in electronics. Instead, they are comprised of nonlinear circuitry which vary in value as impressed voltage and current are varied. Specifically, the resistance value per section ($R_1$) must vary directly as the first power of delay line current, while $C_1$ must vary inversely as the square root of impressed voltage, i.e., $$R_1 = R_o i \qquad (11)$$

$$C_1 = \frac{C_o}{\sqrt{e}} \qquad (12)$$

where $R_o$ = a Constant $C_o$ = a Constant

Using analogy (B) in which voltage ($e$) is proportional to the pressure ($p$) and current ($i$) is proportional to mass flow ($m$), then the requirements for $R_i$ and $C_i$ would be expressed as follows:

$$R_1 = R_o \left(\frac{i}{e}\right) \qquad (13)$$

and $$C_1 = Co \qquad (14)$$

In choosing one of these sets of analogies over the other, a variety of considerations are important. First, consideration must be given to the relationship of operating voltages and currents to the size of electrical components required for an analog with a usable time scaling factor, that is a workable relationship between analog time and real time. It has been shown, however, that the practical considerations involved would permit the use of reasonably sized components, voltages and currents with either set of analogies, and thus, the ultimate selection of analogies depends primarily upon the following considerations:

1. The practicality and ease of evolving and building the circuitry required for obtaining proper resistance and capacitance effects for the pipe sections.
2. The ease and practicality of evolving proper compressor station characteristics for each set of analogies.
3. The ultimate usefulness of the evolved analog to the industry (as for example, the ease by which data may be interpreted).
4. The cost involved in fabricating the circuitry for either set of analogies in sufficient quantity for simulating a complete pipeline system.

ELECTRICAL MODEL OF THE PIPELINE—PIPELINE SECTION ANALOGY

The $p$ $2$ $e$ and $m$ $i$ analogy has been chosen to illustrate the application of this invention and the development of an electrical model. The electrical circuitry used must provide the required nonlinear $R$ & $C$ values as defined by Equations (11) and (12), and, thus, provide a rigorous electrical analog of a pipe section in that its electrical conductive or response characteristics are directly analogous to the flow characteristics of a pipeline. An electrical delay line utilizing nonlinear R-C sections can be coupled to a load corresponding to the load that the fluid piping system to be analoged is connected to, and response of the electrical delay line section to its load will correspond to flow response of pipe section, within the accuracy limitations of the assumptions made. Further, complex piping networks or meshes may be simulated by building analogous electrical meshes using the delay line elements.

Referring to FIG. 2, line section analogs $20a$—$20i$ are shown as connected in series or lumped together to simulate pipelines 12 and 17. Each analog 20 comprises the necessary nonlinear R-C circuitry and is illustrated as representing 6 miles of corresponding pipeline. The 6 miles represent the number of miles per section of analog circuitry to be used and, although the lumping length requirements of any system will vary, it has been found that a lumping length shorter than about one-tenth wave length of the highest frequency transient of interest gives best results. The transient propagation velocity in the nonlinear delay lines 20 is frequency-dependent.

Thus, the analog sections 20 each function as means for electrically simulating the flow of fluid through a portion of the pipeline. As illustrated in FIG. 3, each section 20 is preferably an R-C delay line including a nonlinear resistance means 21, the resistance of which is proportional to the current passing through it, and a nonlinear capacitance means 22, the capacitance of which is inversely proportional to the square root of impressed voltage. As illustrated in FIG. 4, the nonlinear resistance means 21 may include a field effect transistor Q1 which is biased to operate in the desired region by a potential derived from a battery B1. A potentiometer P1 connected across battery B1 allows adjustment of the bias point. The operation of Q1 is based on the inherent characteristics of the source to drain resistance of the field effect transistor which, over a wide range of current, varies to a very close approximation as a direct function of the current. Potentiometer P1 is set to make the source to drain resistance exactly correct for a particular current in the operating range desired. Variations about this point are adequately exact to simulate the desired resistance variation as a function of current to the accuracy required in practice.

The addition of a diode D1 and a resistor R1 across Q1 improves the range over which the characteristic of the resistance of P1 follows the desired equations. This is obtained by making use of the inherent variation of the diode internal impedance as a function of current. The resistor R1 sets the minimum impedance in the branch of the circuit shunting the field effect transistor.

Also, as illustrated in FIG. 4, the nonlinear capacitance means 22 may include a capacitive element C1 which is a semiconductor diode junction exhibiting a capacitance which is a function of the applied voltage. Such semiconductor devices are available with specified capacitance vs. voltage characteristics under names of Vari-caps, varactors, voltage variable capacitors, variable capacitance diodes and others. The junction capacitance of the devices is given by the relation $$C = \frac{C_o}{e^k} \qquad (15)$$

Where $C$ = capacitance at a voltage $e$ $Co$ = capacitance at a particular voltage $k$ = a factor usually between 1/3 and 1/2 dependent on junction formation technique By choosing a device with $k = 1/2$, the criteria of Equation (12) is met and the capacitance will vary as the inverse square root of the line voltage.

Versatility in operating the analog section 20 is afforded both by the proper selection of analog factors and by electrical adjustments. Analog conversion factors may be selected such that a given delay line may be used to simulate virtually any size pipeline, while the electrical adjustment can be used to select optimum operating range and adjust electrical operating curves for best fit to theoretical values. The resistance curve may normally be adjusted within $\pm 5$ percent over a current range of two to one. The typical range of currents used in testing to date on an analog line system varied from about 6 $\mu a$ to 35 $\mu a$. When the DC current is adjusted to around 22 $\mu a$, the sections 20 have an accurate (5 percent) response from about 15 to 30 $\mu a$; this 5 percent refers to correctness of slope of the voltage-drop versus current plot taken on an x-y recorder. However, actual measurements on the analog when coupled as a pipeline system showed that rather wide deviations in electrical performance curves caused negligible changes in transient pipeline response. Typical capacitance curves show that the theoretical curve on capacitance vs. voltage is achieved within 5 percent over a voltage range of four to one. Actual adherence to theoretical curves, of course, depends upon the individual semiconductor devices selected.

COMPRESSOR STATION ANALOG

In evolving an adequate analog of a compressor station to be used as part of an electrical analog model of the whole gas transmission system, the following conditions must prevail:

a. The compressor analog must be compatible with other analog components such as pipe sections, regulators, etc.;

b. It must maintain proper termination impedance for the line section analogs to which it is connected;

c. The analogous mass flow through the compressor analog must be continuous, as mass flow through a compressor is continuous;

d. The differential pressure or pressure head across the compressor station analog must adequately represent the pressure head experienced on the parent fluid system;

e. The compressor station analog must be programable or controllable with the same dispatching or control orders as the actual station. This control aspect requires that the pressure and flow analogies be preserved and controlled in a predictable manner on a basis of fluid and compressor parameters such as bore, stroke, speed, pressure, clearance, horsepower, volume, etc.

The compressor analog disclosed herein is based upon a step-by-step analog of a compressor cylinder cycle, coupled with controlled circuitry to program or control pumping characteristics in a manner analogous to the way that an actual compressor would be controlled or programmed. To achieve this total compressor station analog, the capacitor pump described in U.S. Letters Patent 2,951,638 issued to John V. Hughes and William V. Rollwitz on Sept. 6, 1960, is used to simulate the basic cycling action of a reciprocating compressor, and additional circuitry is added to afford appropriate control and programming capabilities. It is not necessary to simulate the pulsation or high frequency flow transients produced by the reciprocating action of compressor cylinders, and thus performance of the total compressor stations can be adequately simulated by using one equivalent compressor cylinder analog. In such an application, the single capacitor pump and associated circuitry would serve as the analog of an entire compressor station.

The capacitor pump alone will adequately simulate a station under long term steady state (nontransient) flow conditions, since under these conditions suction pressure and discharge pressure would be steady.

However, in order to evolve an effective compressor analog control system, it is essential that recognition be given to the control philosophy used at the actual compressor site to be simulated, which, generally, is to maintain constant discharge pressure regardless of suction pressure or station thru-put (flow rate). This is achieved by varying compressor speed, clearance, horsepower, and number of cylinders in service. By maintaining constant discharge pressure just below pressure rating of the pipeline, operation of the pipeline is maintained at optimum efficiency without overstressing the pressure vessels and piping. The analog control system to be described is designed such that any drop in discharge pressure below the desired set point immediately increases the drive applied to the capacitor pump. The design of the capacitor pump is characterized by its ability to increase thru-put with increases either in the amplitude or frequency of the voltage signal which drives the capacitor pump, as explained below.

Referring to FIGS. 3 and 4, the compressor station analog 23 is shown as including capacitor pump 24. Capacitor pump 24 includes series connected diodes D$a$ and D$b$, the anode of D$a$ functioning as an input for voltage proportional to suction pressure, the cathode of D$b$ as an output for voltage proportional to discharge pressure. A capacitor C$a$ is connected to diodes D$a$ and D$b$ to form a T-section. The capacitor is driven by a variable amplitude alternating current signal and the amplitude and frequency of the driving signal to capacitor C$a$ controls the output voltage of diode D$b$. The driving signal is generated by an AC signal generator 25.

Means is provided for conducting the driving signal to capacitor C$a$ and for responding to changes in the voltage at the output of diode D$b$ corresponding to changes in compressor discharge pressure to cause the driving signal to vary in amplitude an amount sufficient to maintain the output voltage proportional to compressor discharge pressure. In FIG. 4, this means includes a differential amplifier 26 in which the diode D$b$ output voltage ($e5$) is compared with a reference voltage ($er$). The reference voltage is set by a potentiometer P2 which is connected from a voltage source to ground. The reference voltage is generally set to a value proportional to the discharge pressure to be maintained at the compressor station. Any difference between the output ($e\,5$) and reference voltage ($er$) results in an error signal which is amplified in amplifier 26. This signal is then further amplified and its level controlled by a controlled level amplifier 27 consisting of transistors Q2—Q7 and their associated components. The error signal is amplified by transistors Q3—Q5 and then conducted to a symmetrical clipper circuit 28 which consists of transistors Q6 and Q7 and their associated components. This circuit of Q6 and Q7 has the property that its peak-to-peak output level is determined by the operating voltage appearing at point (2) in FIGS. 3 and 4, provided the AC signal generator 25 output level is greater than the required output. The output of the symmetrical limiter goes to transistor Q2 where it is amplified and is then conducted to the compressor cylinder analog 24 and capacitor C$a$. Thus, amplifier 27 operates to maintain the discharge voltage equal to the reference voltage by controlling the peak-to-peak level of the AC drive signal through the symmetrical clipper in response to the error signal from amplifier 26.

Feedback elements resistor R2 and capacitor C2 are connected in parallel from the reference signal input to the output of amplifier 26 and, together with resistors R3 and R8 and potentiometer P2 control the gain and frequency response of amplifier 26. This frequency response must be such that the capacitor pump driving signal is properly attenuated in the controlled level amplifier 27. Thus, the AC signal generator frequency must be much higher than the highest frequency required to simulate the dynamic flow variations. Resistor R5 and capacitor C3 are parallel connected between diode D$b$ output and amplifier 26 input to provide phase correction and improve stability. A resistor R4 and diode D2 are connected in the output circuit of amplifier 26 to prevent circuit malfunction and lock-up under conditions of input signals that would cause the output from amplifier 26 to be positive. The other components in controlled level amplifier 27 are connected in a conventional manner and are used to perform normal circuit functions.

Also, the discharge pressure from the compressor analog may be made to follow a desired dynamic program by feeding a dynamic voltage signal into the reference signal input of amplifier 26 through jack $j1$. The dynamic voltage so applied is added to that from the potentiometer P2 to make the reference to amplifier 26 the sum of the two.

Other variations of the compressor analog control philosophy would be to control the pumping voltage by making use of a variable gain voltage amplifier instead of the symmetrical limiter 28. Another variation could be obtained by controlling the pumping oscillator frequency by the differential amplifier output.

REGULATOR STATION ANALOG

In FIGS. 2, 3 and 4 the regulator station is shown as simulated by regulator station analogs 29 and 30, respectively. In electrical terms, the regulator analog functions to drop voltage from a value proportional to regulator station input (or pipeline termination) pressure (P6) to a constant value proportional to regulator station output (P7). The circuitry employed must prevent variation in output voltage for variations in either or both the output current and input voltage provided the latter is greater than the output voltage. Another requirement that the circuit must meet is that the output current magnitude must be equal to the input current.

Referring to FIG. 3, the regulator station analog 30 is shown as including a series control element 31 connected between the analog pipeline section 20 and a load and a difference amplifier 32 which compares the element 31 output voltage level $e7$ with a reference voltage and amplifies the difference to control the voltage drop across the series regulating element. By use of sufficient gain, the voltage drop in the series element 31 can be made to be that required to keep the output voltage extremely close to the reference voltage.

In FIG. 4 a circuit diagram of one possible embodiment of the regulator station analog 30 is shown. A field effect transistor Q8 is used as the series element to minimize the flow of current in the control electrode and insure continuity of current flow between input and output terminals. A field effect transistor Q9 is also used as the input stage of the differential amplifier 32 to minimize the current required from the line for sensing. In this manner the output current of the regulator analog is maintained equal to the input current. The reference voltage is set by a potentiometer P3 connected in a voltage divider (including resistors R9 and R10) across a source of voltage. A selected portion of Q8 output voltage ($e7$) is applied to the gate electrode G of Q9 and the reference voltage is applied to the source $s$ of Q9. Differences between the reference and output voltages results in an error signal which is amplified in Q9 and further amplified in transistors Q10 and Q11 of the differential amplifier circuit. The potential appearing at the collector of Q10 is connected through a resistor network including resistors R11 and R12 to the gate electrode of Q8. The potential on the gate of Q8 controls the impedance between its source and drain electrodes and thus can control the voltage drop between the input and output terminals. The circuit operates in such a manner that any change that would tend to vary the output voltage causes the gate potential of Q8 to vary in such a manner that the internal impedance is adjusted to maintain the output voltage constant. The output voltage may be adjusted to any desired value by setting potentiometer P3 to provide the appropriate reference potential.

A similar electrical analog 29 could be developed to simulate regulator station 14. The valve 13 could be simulated electrically by an on-off switch SW1 as shown in FIG. 2.

FLOW TRANSIENT AND LOAD SIMULATOR

The primary object of this invention is to study the effects of flow and load transients on the flow of fluid in a fluid flow system, as well as static flow. Thus, where an electrical analog model is used, some means must be devised for simulating electrically the flow transients that the parent flow system is subjected to and then subjecting the electrical model to electrical transients in a manner analogous to the manner in which the flow system is subjected to flow transients. As illustrated in FIGS. 2, 3 and 4, load utilization and flow transients may be simulated by a load function generator 33 which, in the preferred embodiment illustrated, is a combination electrical-mechanical-optical device which can be programmed to generate virtually any voltage time function (wave shape) desired to simulate load utilization. In FIG. 3, a transparent cylinder 34 is rotated by a motor 35. The cylinder 34 carries a mask of opaque material 36 representative of the function to be generated. Strips of opaque tape of the desired length and width may be used to give the desired function. The cylinder 34 is rotated by motor 35 between a light source 37 and a photocell or light sensor 38. Light from the source 37 is focused and collimated by passing it through collimating lenses 39 and slit 39a corresponding in width to the tape strips used. Light then passes through the mask region 36 and falls on photocell 38 which produces an electrical output proportional to the amount of light transmitted through the mask 36. The motor 35 speed may be varied to control the time rate of change of a function so that a time-varying electrical signal may be generated of predetermined shape or spectrum. This signal is amplified by an amplifier 40 which is shown in detail in FIG. 4, and is used as the function signal in the analog system.

The electrical analog signal of the model of FIG. 2 is subjected to the function signal by modulation in a manner analogous to the way the parent flow system is subjected to transients. A flow modular 41, which is a voltage-controlled impedance device, is used to modulate the analog signal current. For example, it may modulate the output of the analog for controlling current withdrawal from the delay line system. The impedance of the flow modulator is controlled by the sum of a dynamic voltage signal from the load function generator and the setting of potentiometer P3 of FIG. 4 and transcribes this signal to actual current loading of the delay line system. For example, if a sinusoidal modulation of the current (analogous flow) is desired from the delay line, a sinusoidal voltage signal is introduced into the flow modulator. This signal results in a sinusoidal variation of load impedance, and, since this impedance is connected to a regulated (steady) voltage, a sinusoidal modulation of the previously steady current will result.

Of course, the function generator can be programmed to represent any variation from steady state flow and this signal can be impressed at any place along the analog model corresponding to where the variation is introduced in the parent system. For example, it could be programmed to represent predicted variations in compressor discharge pressure and be introduced as the reference signal to the differential amplifier 26.

Also, in programming the opaque tape 36 care should be taken to insure that nonlinearities due to uneven light distribution, nonuniform transmission of the cylinder material, and nonlinear response of the photocell will not result. This can be done by programming (i.e., placing the tape strips) directly in accordance with the photocell output voltage while indexing the cylinder.

FLOW SYSTEM ANALOG

Having described the various components of an electrical analog model and their relation to corresponding components in the parent flow system, it is necessary to describe the connection and operation of these components in the electrical analog model flow system analog. In this way, the effects of variation of an electrical quality anywhere in the electrical model, upon electrical qualities elsewhere in the model, will be proportional in a known manner to the effect of a corresponding variation in a flow quality upon flow qualities elsewhere in the flow system. The electrical variations need only be measured and converted by the proper conversion factor to give the corresponding flow variations. Thus, analogous flow conditions are imposed on the analog model and direct measurements are then possible as to system response to these flow conditions.

Since the fluid system analog is made up of various individual component analogs used in combinations, it is necessary that each of these components be adjusted to utilize the same basic analogies and the same or at least compatible basic scaling factors. For example, if voltage is proportional to pressure squared and current is proportional to mass flow, it is usually convenient to have the same analogies throughout the total system; further, it is usually convenient to keep the proportionality constants between voltage and pressure and current and flow the same for each line section, for the compressor analogs, the regulator valves, etc. While it is convenient to keep these factors constant throughout the system, special transformations may be used to permit variation of these factors at convenient points in the system, and even to permit changing the basic analogies. Of course, the analog is useful for studying pipeline or piping flow even if no compressors or regulators are involved, when, for example, well head pressure is sufficient to remove the gas and a block valve may be used to control discharge of the gas into another system. Also, the analog is applicable to virtually any form of closed, one-dimensional flow regime, such as hydraulic systems wherein the tubing and hoses and even the duct systems can be simulated.

With reference to FIGS. 2, 3 and 4, the analog model shown therein operates as follows. A system input pressure (P1) set point is selected for the fluid system. This may be the discharge pressure from another pipeline or from a storage reservoir. An analogous voltage ($e1$) for the square of this pressure is set by a battery B2. The voltage chosen will depend primarily on the range of pressures to be simulated and the minimum and maximum voltage required for the electrical system. Once the voltage is selected, the conversion factor a can be determined from the formula $p^2=ae$ and then used to convert pressure to corresponding voltage throughout the system. Voltages proportional to the discharge pressure squared of compressor stations 11 and 16 are then selected as reference voltages and each provides the reference signal input for the difference amplifiers 26 of the compressor station analogs. The actual discharge voltages $e2$ and $e5$ are then compared by the difference amplifiers with their respective reference voltages to produce an error signal which is used to control the output level of the controlled level amplifier 27. Capacitor pump 24 thru-put is thus controlled so that discharge voltages $e2$ and $e5$ are proportional to compressor station discharge pressures (P2, P5) squared.

The compressor analog output voltages $e2$ and $e5$, respectively, set the input voltages for the delay lines representing the pipeline sections 12 and 17. The voltage drop across each delay line 20 is set to represent and be proportional to the pressure drop across a corresponding pipeline section, and the value of C1 is chosen according to formula (15) above for a given voltage. Regulator station analog 29 converts input voltage at $e3$ corresponding to pressure P3 squared to a constant lower value $e3'$ proportional to regulator station 14 output pressure P3' squared. Regulator station analog 30 converts the output of the terminal delay line 20$i$ to voltage $e7$ proportional to regulator station 18 output pressure (P7) squared. The output voltage of the regulator station analog is set by setting the reference voltage input to difference amplifier 32 through potentiometer P2 to a reference voltage proportional to the regulator station output.

With the setup described above, an electrical analog model of the static flow of gas in the system of FIG. 1 has been built. However, since the analogy and the nonlinear electrical circuitry requirements developed and used were based on a fluid system including transient flow, electrical transients corresponding to the flow transients can be imposed on the analog model, and then the response of the electrical quantities through the model to the electrical transients can be observed and measured. These electrical values measured will bear a known relationship to corresponding flow values. As described earlier, the transients are simulated by properly programming the tape 36 of the load function generator 33. The analog model is modulated by these transients at the regulator station analog output by flow modulator 40.

It can be seen that the analog model disclosed herein provides a means which can be used to investigate the physical phenomena of transient flow in pipelines, in a manner which will permit the expression of these phenomena in terms of pipeline operation control and design. It provides a means for predicting pipeline operating conditions based upon the flow response characteristics of the pipeline system operating under variable load conditions. The individual analog components (such as compressor and regulator stations) are coupled together on a block-by-block representation of the parent pipeline system and once the response of these individual components have been simulated, interaction of these component responses, or transient coupling, is automatically obtained to give adequate simulation of the response of the parent piping system. Thus, all data or operating characteristics of the pipeline are virtually immediately obtainable on the analog model in direct analogy to that which would be observed on an actual pipeline installation. This data can be used in designing, building, operating, and maintaining the transmission system economically and efficiently, and in instructing others in the proper techniques for accomplishing these objectives.

Although the above description has been directed to developing nonlinear electrical analog circuitry for steady state and transient flow evaluation, it should be recognized that by using the same principles to evolve the necessary analogies, a linear "transient only" analog model can be built. If the average conditions of steady-state flow and pressure are defined, then the circuit component sizes can be defined by these conditions and an analog built which would define transient response for that combination of line and steady flow parameters. Of course, for other average flow conditions different values in the R-C delay line would have to be used. Although the use of the linear "transient only" analog would be more limited than the nonlinear analog, it could be used as a valuable tool in checking concepts of the more sophisticated nonlinear analog, and in supplying data quickly against which the nonlinear analog could be checked.

From the foregoing, it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what we claim is:

1. An analog system for electrically simulating the flow of fluid through a pipeline system wherein fluid is being conducted under pressure, for defining flow characteristics therein, including the effect of flow transients on said flow, and wherein said pipeline system includes at least one pipeline section having an inlet connected to a source of said fluid and a load connected to an outlet of said pipeline section for withdrawal and use of said fluid, said analog system comprising, in combination: a source of electrical energy for simulating the source of fluid at said inlet by providing an electrical analog signal having electrical values proportional to flow values at said inlet, including fluid pressure and rate of flow of the fluid at the inlet said electrical analog signal having a voltage proportional to one of said flow values and an electrical current proportional to another of said flow values; pipeline section analog means coupled at its input terminal to said source for receipt of said electrical analog signal and simulating said pipeline section, said pipeline section analog means responding to said electrical values of said electrical analog signal and causing variations thereof proportional to changes in said flow values of fluid conducted through said pipeline section and storing at least a part of the energy supplied from said source to said pipeline section analog means to simulate fluid pack, the electrical values of said electrical analog signal at the output terminal of said pipeline section analog simulating flow values at said outlet; and load transient analog means for simulating said load by providing a variable electrical signal proportional to flow transients the effect of which on fluid flow to said pipeline section is to be simulated, said transient analog means being connected to the output terminal of said pipeline section analog means and modulating said electrical analog signal with said variable electrical signal in a manner analogous to the manner in which fluid flow is subjected to flow transients at said outlet, whereby changes which can be measured in electrical values in the electrical analog system in response to said variable electrical signal, correspond to changes in the flow values of the flow system in response to flow transients.

2. The combination of claim 1 wherein said pipeline system to be analoged includes at least one compressor station connected between said inlet and said outlet for maintaining the fluid at sufficient pressures for transportation and utilization, and said analog system further includes means connected between said source of electrical energy and said pipeline section analog means for electrically simulating the compressor station and its effects on fluid pressure and flow.

3. The combination of claim 1 wherein said pipeline system to be analoged includes at least one regulator connected between said inlet and said outlet for maintaining fluid conducted to a load at substantially constant pressure despite varying flow rates, and said analog system further includes means connected between said pipeline section analog means and said load transient analog means for electrically simulating the regulator and its effects on fluid pressure and flow.

4. The combination of claim 2 wherein said pipeline system to be analoged includes at least one regulator connected between said compressor station and said outlet for maintaining fluid conducted to a load at substantially constant pressure despite varying flow rates, and said analog system further includes means connected between said pipeline section analog means and said load transient analog means for electrically simulating the regulator and its effects on fluid pressure and flow.

5. The combination of claim 4 wherein said compressor station simulating means includes means converting said electrical analog signal from a value proportional to compressor station suction pressure to a value proportional to compressor discharge pressure, and said regulator simulating means includes means for converting said electrical analog signal from a value proportional to fluid pressure at a pipeline termination to a lesser constant value for electrically simulating pressure regulation of the regulator in response to varying loads.

6. The analog of claim 5 wherein fluid pressure squared is proportional to and simulated by an electrical voltage and the fluid mass flow is proportional to and simulated by an electrical current throughout the analog.

7. The analog of claim 6 wherein said electrical analog signal includes a direct current voltage proportional to pipeline inlet pressure squared, and said pipeline section analog means includes a delay line for simulating fluid flow response through said pipeline section, said delay line including a nonlinear resistance means, the resistance of which is proportional to the current passing through it to simulate the effect of pipeline friction on fluid flow, and nonlinear capacitance means the capacitance of which is inversely proportional to the square root of the impressed voltage for simulating pipeline storage responses to transient flow.

8. An analog for electrically simulating the flow of fluid through a pipeline system conducting fluid under pressure, for defining flow characteristics therein, including the effects of flow transients on said flow, said pipeline system including a pipeline section having an inlet connected to a source of fluid and an outlet connected to a load, said analog comprising, in combination: means providing a first electrical signal having values proportional to flow qualities of the fluid at the inlet of said pipeline section; means for simulating said pipeline section by responding to said first electrical signal and converting it to a second electrical signal having values proportional to flow qualities of the fluid at the outlet of said pipeline section, including means simulating the effects of pipeline friction and fluid pack on pipeline flow; means providing a third electrical signal proportional to flow transients the effect of which on fluid flow is to be simulated; and means for modulating said second electrical signal with said third electrical signal in a manner analogous to the manner in which the fluid flow in the pipeline is subjected to flow transients, whereby changes which can be measured in electrical qualities of the electrical analog in response to said third electrical signal, corresponding to changes in the flow qualities of the flow system in response to flow transients.

9. A compressor station analog for simulating a compressor station along a fluid transmission system, said analog comprising, in combination: an input terminal adapted to be connected to a source of electrical voltage proportional to compressor station suction pressure; an output terminal adapted to be connected to a variable load representing flow transients at compressor station discharge; and means connected between said input terminal and output terminal and responding to the variations in said variable load when connected to said output terminal to convert said electrical voltage when said input terminal is connected to said source to a value at said output terminal proportional to compressor station discharge pressure.

10. The analog of claim 9 wherein said means connected between said input terminal and said output terminal includes a capacitor pump connected to said input terminal, said pump having a capacitor and first and second rectifiers connected to said capacitor to form a T-section means generating an alternating current driving signal for driving said capacitor pump; and means coupling said driving signal generating means to said capacitor pump, said last mentioned means responding to changes in the voltage at said to vary said driving signal an amount sufficient to maintain said output terminal voltage proportional to compressor discharge pressure.

11. A regulator electrical analog for simulating a regulator connected in a fluid flow system and providing constant discharge pressure despite varying mass flow in said system, comprising, in combination: an input for receipt of an electrical signal of a varying value which is proportional to fluid pressure at the inlet to said regulator; variable impedance means connected to said input and converting said value of said electrical signal to a lesser constant value at an output for electrically simulating pressure regulation of the regulator in response to varying loads; an electrical load connected to such output and simulating a fluid load requiring a constant pressure despite varying mass flow, and means connected to said output and to said variable impedance means and responding to said electrical signal at said output for causing said variable impedance means to automatically vary to provide said lesser constant value.

12. Apparatus adapted to be connected in a fluid flow system electrical analog for simulating flow transients including load withdrawal demands on the fluid system and impressing said transients on the electrical analog of said system, and wherein said electrical analog is provided by an electrical signal having electrical values corresponding to flow values in said flow system, said apparatus comprising, in combination: a function generator providing an electrical current output having a wave form, the amplitude of which is proportional to the volume of fluid withdrawal and the duration of which is proportional to the period of withdrawal, and flow modulation means connected to said function generator for receipt of said electrical current output, the output of said flow modulation means adapted to be connected to said electrical analog for modulating said electrical signal with an electrical current which simulates said flow transient.

13. The apparatus of claim 12 wherein said function generator includes a source of light, a light sensor responding to said light to provide said electrical current output; an opaque program tape extending through the path of light between said light and said light sensor, said tape being programmed to simulate volume of fluid utilization; and means for moving said tape through said path at a rate so that said electrical output simulates the amount and the rate of fluid withdrawal from said fluid flow system.

14. A method of simulating fluid flow through at least a portion of fluid flow system conducting fluid under pressure for defining flow characteristics therein including the effect of flow transients on said flow, by an electrical analog wherein electrical values are related to flow values in said fluid flow system comprising the steps of: generating a first electrical signal having an electrical value proportional to portion input pressures and another value proportional to the rate of fluid flow at the input of said fluid flow system; causing said first electrical signal to be altered on amount proportional to the pressure drop of the fluid due to friction and inertia as said fluid flows through said portion and causing said first electrical signal to be altered an amount proportional to the change in rate of flow of fluid from the inlet of said portion to the outlet of said portion; utilizing said first electrical signal to store electrical energy in an amount proportional to the fluid pack capacity of said portion; generating a second electrical signal proportional to flow transients, the effect of which on fluid flow is to be simulated; and modulating said first electrical signal with said second signal to simulate the effect of flow transients on fluid flow in the flow system whereby changes which can be measured in the electrical values of the said first electrical signal in response to said second electrical signal, correspond to changes in the flow values of the flow system in response to flow transients.

15. The method of claim 14 wherein said flow system is a transmission system including at least one compressor station along a pipeline for maintaining the fluid at sufficient pressures for transportation, and further including the step of increasing said first electrical signal from a value proportional to compressor station suction pressure to a value proportional to compressor station discharge pressure.

16. The method of claim 15 wherein said flow system is a transmission system including at least one regulator for maintaining fluid conducted from a pipeline to a load or from a source at substantially constant pressure despite varying flow rates, and further including the step of decreasing said first electrical signal from a value proportional to regulator station output pressure.

17. The method of claim 15 wherein said flow system is a transmission system including at least one regulator for maintaining fluid conducted from a pipeline to a load or from a source at substantially constant pressure despite varying flow rates, and further including the step of decreasing said first electrical signal from a value proportional to regulator input pressure to a value proportional to regulator station output pressure.

18. The method of claim 14 wherein said second electrical signal includes electrical quantities proportional to the rate and quantity of fluid utilization by said load.